US009756626B2

(12) United States Patent
Ghosh et al.

(10) Patent No.: US 9,756,626 B2
(45) Date of Patent: Sep. 5, 2017

(54) HIGH-EFFICIENCY WI-FI (HEW) STATION AND ACCESS POINT (AP) AND METHOD FOR SIGNALING OF CHANNEL RESOURCE ALLOCATIONS (71) Applicant: Intel IP Corporation, Santa Clara, CA (US)

(72) Inventors: Chittabrata Ghosh, Fremont, CA (US); Shahrnaz Azizi, Cupertino, CA (US); Robert J. Stacey, Portland, OR (US); Po-Kai Huang, West Lafayette, IN (US); Thomas J. Kenney, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 162 days.

(21) Appl. No.: 14/669,101

(22) Filed: Mar. 26, 2015

(65) Prior Publication Data

US 2016/0143005 A1 May 19, 2016

Related U.S. Application Data (60) Provisional application No. 62/079,366, filed on Nov. 13, 2014, provisional application No. 62/091,939, filed on Dec. 15, 2014.

(51) Int. Cl.
*H04W 72/04* (2009.01)
*H04W 52/02* (2009.01)
(Continued)

(52) U.S. Cl.
CPC ..... *H04W 72/042* (2013.01); *H04W 52/0209* (2013.01); *H04W 74/04* (2013.01);
(Continued)

(58) Field of Classification Search
None
See application file for complete search history.

(56) References Cited

U.S. PATENT DOCUMENTS

2013/0156002 A1 6/2013 Kuchibhotla et al.
2014/0314064 A1 10/2014 Park et al.
(Continued)

FOREIGN PATENT DOCUMENTS

KR 1020090074106 A 7/2009
WO WO-2014171788 A1 10/2014

OTHER PUBLICATIONS

"International Application Serial No. PCT/US2015/055085, International Search Report mailed Jan. 27, 2016", 3 pgs.
(Continued)

*Primary Examiner* — Kodzovi Acolatse
(74) *Attorney, Agent, or Firm* — Schwegman Lundberg & Woessner, P.A.

(57) ABSTRACT

Embodiments of a high-efficiency Wi-Fi (HEW) station, access point (AP), and method for communication in a wireless network are generally described herein. In some embodiments, the HEW AP may transmit a resource allocation message to indicate an allocation of channel resources for uplink transmissions by one or more HEW stations. The channel resources may include multiple channels, each of which may include multiple sub-channels and an extra portion of channel resources. The resource allocation message may include multiple sub-channel allocation blocks to indicate an allocation for a particular HEW station. A length of the sub-channel allocation blocks may be based on various factors, such as a number of channels included in the channel resources and a sub-carrier bandwidth.

30 Claims, 5 Drawing Sheets (51) Int. Cl.
*H04W 74/04* (2009.01)
*H04W 84/12* (2009.01)
*H04W 88/08* (2009.01)
*H04W 74/00* (2009.01)

(52) U.S. Cl.
CPC ...... *H04W 72/0446* (2013.01); *H04W 74/006* (2013.01); *H04W 84/12* (2013.01); *H04W 88/08* (2013.01); *Y02B 60/50* (2013.01)

(56) References Cited

U.S. PATENT DOCUMENTS

| | | |
|---|---|---|
| 2014/0328264 A1 | 11/2014 | Merlin et al. |
| 2015/0327217 A1* | 11/2015 | Aboul-Magd ...... H04W 72/121 370/329 |
| 2016/0073409 A1* | 3/2016 | Chen ............... H04L 5/0037 370/329 |
| 2016/0088600 A1* | 3/2016 | Yang ............... H04W 72/044 370/329 |

OTHER PUBLICATIONS

"International Application Serial No. PCT/US2015/055085, Written Opinion mailed Jan. 27, 2016", 6 pgs.

\* cited by examiner

HIGH-EFFICIENCY WI-FI (HEW) STATION AND ACCESS POINT (AP) AND METHOD FOR SIGNALING OF CHANNEL RESOURCE ALLOCATIONS

PRIORITY CLAIM

This application claims priority under 35 USC 119(e) to U.S. Provisional Patent Application Ser. No. 62/079,366 filed Nov. 13, 2014 and to U.S. Provisional Patent Application Ser. No. 62/091,939 filed Dec. 15, 2014, both of which are incorporated herein by reference in their entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax study group (SG) (named DensiFi). Some embodiments relate to high-efficiency (HE) wireless or high-efficiency WLAN or Wi-Fi (HEW) communications. Some embodiments relate to multi-user (MU) multiple-input multiple-output (MIMO) communications and orthogonal frequency division multiple access (OFDMA) communication techniques. Some embodiments relate to resource allocation and signaling of such.

BACKGROUND

Wireless communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). A recently-formed study group for Wi-Fi evolution referred to as the IEEE 802.11 High Efficiency WLAN (HEW) study group (SG) (i.e., IEEE 802.11 ax) is addressing these high-density deployment scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
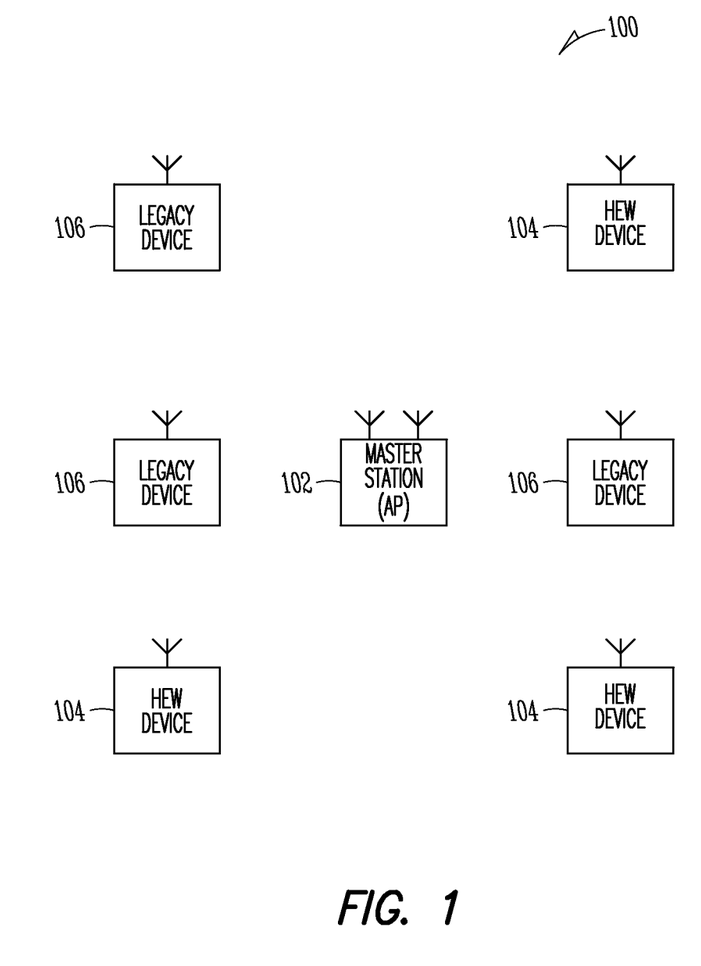
FIG. 1 illustrates a High Efficiency Wi-Fi (HEW) network in accordance with some embodiments.

FIG. 1 illustrates a High Efficiency (HE) Wi-Fi (HEW) network in accordance with some embodiments. HEW network 100 may include a master station (STA) 102, a plurality of HEW stations 104 (HEW devices), and a plurality of legacy stations 106 (legacy devices). The master station 102 may be arranged to communicate with the HEW stations 104 and the legacy stations 106 in accordance with one or more of the IEEE 802.11 standards. In accordance with some HEW embodiments, an access point may operate as the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 using one or more HEW frames. During the HEW control period, legacy stations 106 may refrain from communicating. In some embodiments, the master-sync transmission may be referred to as a control and schedule transmission.

In some embodiments, the HEW AP 102 may transmit, to one or more HEW stations 104, a resource allocation message that indicates an allocation of channel resources for uplink transmissions by the HEW stations 104. The HEW stations 104 may perform uplink transmissions to the HEW AP 102 according to the allocation. These embodiments will be described in more detail below.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HEW control period may be configured for uplink or downlink data communications.

The master station 102 may also communicate with legacy stations 106 in accordance with legacy IEEE 802.11 communication techniques. In some embodiments, the master station 102 may also be configurable communicate with the HEW stations 104 outside the HEW control period in accordance with legacy IEEE 802.11 communication techniques, although this is not a requirement.

In some embodiments, the HEW communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, subchannel bandwidths less than 20 MHz may also be used. In these embodiments, each channel or subchannel of an HEW communication may be configured for transmitting a number of spatial streams.

In accordance with embodiments, a master station 102 and/or HEW stations 104 may generate an HEW packet in accordance with a short preamble format or a long preamble format. The HEW packet may comprise a legacy signal field (L-SIG) followed by one or more high-efficiency (HE) signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wi-Fi operation.

Figure 2:
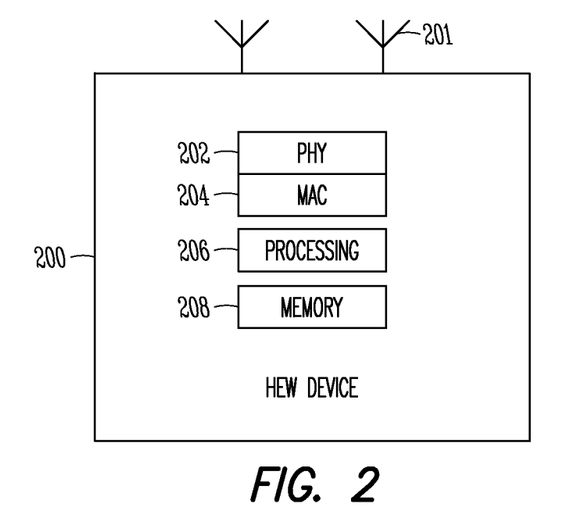
FIG. 2 illustrates an HEW device in accordance with some embodiments.

FIG. 2 illustrates an HEW device in accordance with some embodiments. HEW device 200 may be an HEW compliant device that may be arranged to communicate with one or more other HEW devices, such as HEW stations and/or a master station, as well as communicate with legacy devices. HEW device 200 may be suitable for operating as master station or an HEW station. In accordance with embodiments, HEW device 200 may include, among other things, physical layer (PHY) circuitry 202 and medium-access control layer circuitry (MAC) 204. PHY 202 and MAC 204 may be HEW compliant layers and may also be compliant with one or more legacy IEEE 802.11 standards. PHY 202 may be arranged to transmit HEW frames. HEW device 200 may also include other processing circuitry 206 and memory 208 configured to perform the various operations described herein.

In accordance with some embodiments, the MAC 204 may be arranged to contend for a wireless medium during a contention period to receive control of the medium for the HEW control period and configure an HEW frame. The PHY 202 may be arranged to transmit the HEW frame as discussed above. The PHY 202 may also be arranged to receive an HEW frame from HEW stations. MAC 204 may also be arranged to perform transmitting and receiving operations through the PHY 202. The PHY 202 may include circuitry for modulation/demodulation, upconversion and/or down-conversion, filtering, amplification, etc. In some embodiments, the processing circuitry 206 may include one or more processors. In some embodiments, two or more antennas may be coupled to the physical layer circuitry arranged for sending and receiving signals including transmission of the HEW frame. The memory 208 may store information for configuring the processing circuitry 206 to perform operations for configuring and transmitting HEW frames and performing the various operations described herein.

In some embodiments, the HEW device 200 may be configured to communicate using OFDM communication signals over a multicarrier communication channel. In some embodiments, HEW device 200 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the invention is not limited in this respect as they may also be suitable to transmit and/or receive communications in accordance with other techniques and standards. In some other embodiments, HEW device 200 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, HEW device 200 may be part of a portable wireless communication device, such as a personal digital assistant (PDA), a laptop or portable computer with wireless communication capability, a web tablet, a wireless telephone or smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, HEW device 200 may include one or more of a keyboard, a display, a non-volatile memory port, multiple antennas, a graphics processor, an application processor, speakers, and other mobile device elements. The display may be an LCD screen including a touch screen.

The antennas 201 of HEW device 200 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201 may be effectively separated to take advantage of spatial diversity and the different channel characteristics that may result between each of antennas and the antennas of a transmitting station.

Although HEW device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of HEW device 200 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Embodiments disclosed herein provide two preamble formats for High Efficiency (HE) Wireless LAN standards specification that is under development in the IEEE Task Group 11ax (TGax).

In accordance with embodiments, the HEW AP 102 may transmit a resource allocation message to indicate an allocation of channel resources for uplink transmissions by one or more HEW stations 104. The channel resources may include multiple channels, each of which may include multiple sub-channels and an extra portion of channel resources. The resource allocation message may include multiple sub-channel allocation blocks to indicate an allocation for a particular HEW station 104. A length of the sub-channel allocation blocks may be based on various factors, such as a number of channels included in the channel resources and a sub-carrier bandwidth. These embodiments will be described in more detail below.

In some embodiments, the channel resources may be used for downlink transmission by the HEW AP 102 and for uplink transmissions by the HEW stations 104. That is, a time-division duplex (TDD) format may be used. In some cases, the channel resources may include multiple channels, such as the 20 MHz channels previously described. The channels may include multiple sub-channels or may be divided into multiple sub-channels for the uplink transmissions to accommodate multiple access for multiple HEW stations 104. The downlink transmissions may or may not utilize the same format.

In some embodiments, the downlink sub-channels may comprise a predetermined bandwidth. As an example, the sub-channels may each span 2.03125 MHz, the channel may span 20 MHz, and the channel may include eight or nine sub-channels. As another example, the sub-channels may each span 2.5 MHz, the channel may span 20 MHz, and the channel may include eight sub-channels. These examples are not limiting, however, and any suitable frequency span for the sub-channels may be used. It should be noted that reference may be made to a sub-channel of 2.03125 MHz for illustrative purposes. Such references are not limiting, however, as a 2.0 MHz sub-channel, a 2.5 MHz sub-channel or a sub-channel of another size may also be used in some cases. In some embodiments, the frequency span for the sub-channel may be based on a value included in an 802.11 standard (such as 802.11ax), a 3GPP standard or other standard.

In some embodiments, the sub-channels may comprise multiple sub-carriers. Although not limited as such, the sub-carriers may be used for transmission and/or reception of OFDM or OFDMA signals. As an example, each sub-channel may include a group of contiguous sub-carriers spaced apart by a pre-determined sub-carrier spacing. As another example, each sub-channel may include a group of non-contiguous sub-carriers. That is, the channel may be divided into a set of contiguous sub-carriers spaced apart by the pre-determined sub-carrier spacing, and each sub-channel may include a distributed or interleaved subset of those sub-carriers. The sub-carrier spacing may take a value such as 78.125 kHz, 312.5 kHz or 15 kHz, although these example values are not limiting. Other suitable values that may or may not be part of an 802.11 or 3GPP standard or other standard may also be used in some cases.

It should be noted that for a 78.125 kHz sub-carrier spacing, a group of 26 contiguous sub-carriers may comprise a bandwidth of 2.03125 MHz. Accordingly, an allocation of a sub-channel of this size may also be referred to as a "26 tones" allocation or similar. In addition, 26 sub-carriers may be selected from a non-contiguous set of sub-carriers to form a distributed or interleaved sub-channel, as described above. In this case, the sub-channel may still be referred to as a "26 tones" sub-channel or as a 2.013125 MHz channel or similar, although a contiguous bandwidth may not necessarily be spanned.

Figure 3:
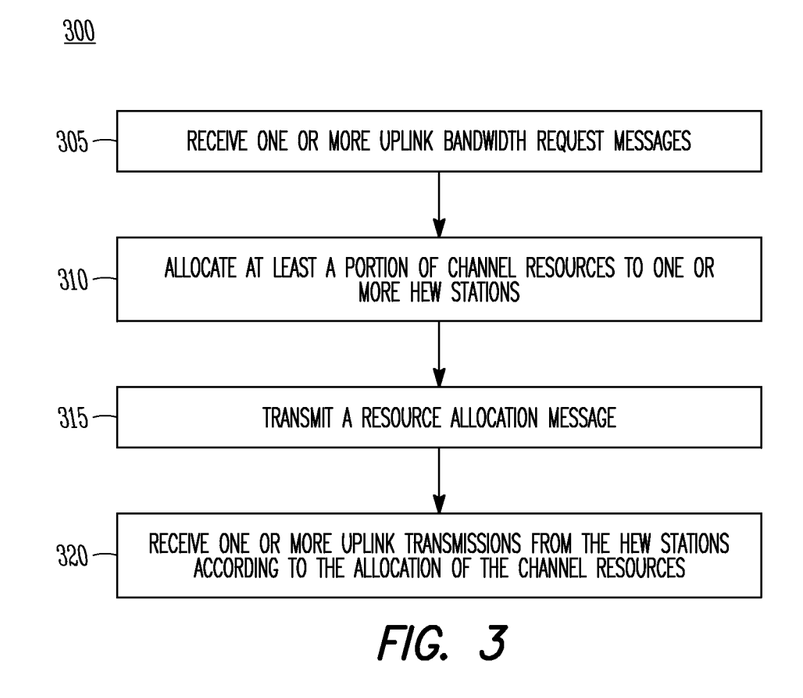
FIG. 3 illustrates the operation of a method of channel resource allocation signaling in accordance with some embodiments.

FIG. 3 illustrates the operation of a method of channel resource allocation signaling in accordance with some embodiments. It is important to note that embodiments of the method 300 may include additional or even fewer operations or processes in comparison to what is illustrated in FIG. 3. In addition, embodiments of the method 300 are not necessarily limited to the chronological order that is shown in FIG. 3. In describing the method 300, reference may be made to FIGS. 1-2 and 4-6, although it is understood that the method 300 may be practiced with any other suitable systems, interfaces and components.

In addition, while the method 300 and other methods described herein may refer to HEW stations 104 and HEW APs 102 operating in accordance with 802.11 or other standards, embodiments of those methods are not limited to just those HEW stations 104 or HEW APs 102 and may also be practiced on other mobile devices, such as a user station (STA), an Evolved Node-B (eNB) or User Equipment (UE). The method 300 and other methods described herein may also be practiced by wireless devices configured to operate in other suitable types of wireless communication systems, including systems configured to operate according to various Third Generation Partnership Project (3GPP) Long Term Evolution (LTE) standards.

At operation 305 of the method 300, one or more uplink bandwidth request messages may be received at the HEW AP 102. The messages may include one or more station IDs or other identifiers associated with HEW stations 104 requesting uplink data resources. The messages may also include other related information, including a size of data to be transmitted, a desired data transmission rate or other information. It should be noted that the reception of the messages may occur over any suitable time interval, and is not limited to reception during a same control period. That is, some of the messages may arrive at the HEW AP 102 during different control periods in some cases. As an example, the control period may be a period associated with a random access procedure in which HEW stations 104 may transmit control messages, such as access requests, which may include the uplink bandwidth request messages.

At operation 310, the HEW AP 102 may allocate at least a portion of channel resources to one or more HEW stations for use in uplink transmissions. The allocation may be based at least partly on the uplink bandwidth request messages, in some cases. That is, bandwidth needs or requirements or other information included in the bandwidth request messages may be considered by the HEW AP 102 during the allocation process. For instance, a size of a portion of the channel resources allocated to a particular HEW station 104 may be based on a value specified by that HEW station 104 in a bandwidth request. The allocation may be performed for HEW stations 104 that have requested uplink transmission resources in a current or previous time period, although the scope of embodiments is not limited in this respect.

The channel resources may include one or more channels that may include one or more sub-channels. In some embodiments, the number of channels may be selected from one, two, four or eight, and each channel may comprise a bandwidth of 20 MHz. As an example, the channel resources may comprise contiguous bandwidths of 20 MHz, 40 MHz, or 80 MHz, as previously described, and may be partitioned into one, two, or four channels of 20 MHz bandwidth. As another example, the channel resources may comprise an 80+80 MHz (160 MHz) non-contiguous bandwidth, which may be partitioned into eight channels of 20 MHz bandwidth. These examples are not limiting, however, as other suitable values may be used for the bandwidth of the channel resources and/or the channels.

The channel resources may also include one or more extra portions of channel resources, which will be described below. In some embodiments, each of the channels may include an integer number of sub-channels and may further include an extra portion of channel resources. In other embodiments, different configurations may be used for some of the channels in terms of whether or not the extra portion is included, a number of sub-channels included or other factors. As a non-limiting example, the extra portion may comprise a bandwidth of 2.03125 MHz, which may be 26 sub-carriers spaced apart by 78.125 MHz, as previously described. The extra portion, in this example, may be referred to as an "extra 26 tones allocation" or similar. The 26 sub-carriers may also be selected as a distributed or interleaved subset of a larger set of contiguous sub-carriers included in the channel, in some cases. In some embodiments, the extra portion may be located in a pre-defined position within the channel, such as a center portion straddling the direct current (DC) sub-carrier or a position at the left edge or right edge of the channel.

Various allocations may be considered. As an example, an HEW station 104 may be allocated one or more sub-channels in different channels, such as a first sub-channel that is included in a first channel and a second sub-channel that is included in a second channel. As another example, the HEW station 104 may be allocated contiguous or non-contiguous sub-channels included in a particular channel. As another example, the HEW station 104 may be allocated one of the extra portions of channel resources. Although these examples may illustrate some possible allocations that may be used, they are not limiting.

At operation 315, the HEW AP 102 may transmit a resource allocation message to indicate an allocation of channel resources for uplink transmissions by one or more HEW stations 104. In some embodiments, the resource allocation message may be included in an HEW SIG-B signaling message. It should be noted that the resource allocation message is not limited to transmission as part of the HEW SIG-B signaling message, however, and may also be transmitted as part of another type of message or may be an individual or stand-alone message in some cases.

Figure 4:
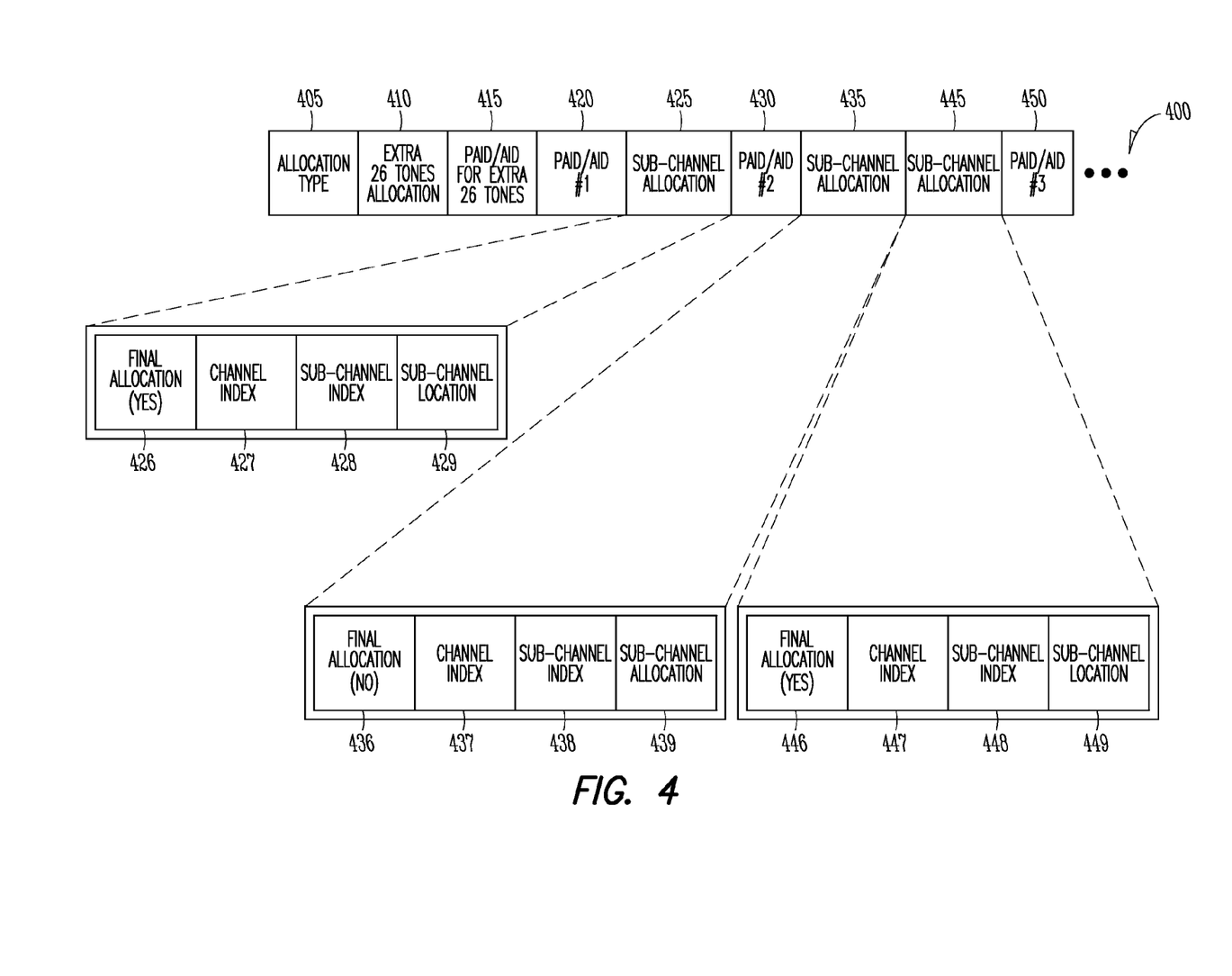
FIG. 4 illustrates an example of an HEW SIG-B signaling message in accordance with some embodiments.

FIG. 4 illustrates an example of an HEW SIG-B signaling message in accordance with some embodiments. It should be noted that embodiments are not limited by the ordering, format or presentation of the parameters and information as shown in FIG. 4. In addition, some embodiments of the resource allocation message and/or the HEW SIG-B signaling message 400 may or may not include some or all of the parameters and information shown, and may also include additional parameters and information not shown in FIG. 4. For ease of illustration, the HEW SIG-B signaling message 400 shows allocations for just two HEW stations 104, which are identified in the blocks 420 and 430. It should be noted that embodiments are not limited to this number, as additional or fewer HEW stations 104 may be used.

In some embodiments, the resource allocation message may include a resource distribution indicator to indicate whether the HEW stations are allocated contiguous portions of the channel resources. The resource distribution indicator may indicate any suitable number of allocation types, including any or all of contiguous, non-contiguous, distributed, special tone, or other allocation type. Referring to the example HEW SIG-B signaling message 400 in FIG. 4, the allocation type 405 may be or may be similar to the resource distribution indicator. As an example, the allocation type 405 may include two bits mapped to contiguous (00), distributed (01), special tone (10), and non-contiguous (11) allocations.

As an example, the resource distribution indicator may indicate contiguous allocation of the channel resources. Accordingly, an allocation for each HEW station 104 may include a contiguous group of sub-channels. For instance, when a channel includes eight sub-channels indexed on 1-8 and an extra portion, a contiguous allocation may allocate the first two sub-channels (#1 and #2) to a first HEW station 104, the remaining six sub-channels (#3-#8) to a second HEW station 104, and the extra portion to a third HEW station 104.

As another example, the resource distribution indicator may indicate non-contiguous allocation of the channel resources. Accordingly, an allocation for at least one of the HEW station 104s may include a non-contiguous group of sub-channels. For instance, when a channel includes eight sub-channels indexed on 1-8 and an extra portion, a non-contiguous allocation may allocate the sub-channels #1 and #3 to a first HEW station 104, the sub-channels #2, #4, and #6 to a second station 104, and the remaining sub-channels (#5, #7, and #8) to a third HEW station 104, and the extra portion to a fourth HEW station 104.

It should be pointed out that in this example, the first HEW station 104 is allocated sub-channels #1 and #3 and is not allocated sub-channel #2, which is located between sub-channels #1 and #3. In addition, the non-contiguous group of sub-channels allocated to the first HEW station 104 includes sub-channel #3, excludes the sub-channels #2 and #4 that are adjacent to sub-channel #3, and includes another sub-channel (#1). In some embodiments, it may be possible for a non-contiguous group of sub-channels to include sub-channels on at least two different channels.

As another example, the resource distribution indicator may indicate distributed allocation of the channel resources. As part of such a distributed allocation, the sub-channels of a channel may include multiple sub-carriers interleaved in frequency. That is, as previously described, the channel may include a set of sub-carriers and each sub-channel may include a non-contiguous subset of the sub-carriers in the channel. That is, the sub-carriers may be spread over the channel bandwidth, to some extent, which may provide possible frequency diversity benefits. In addition, a higher transmit power per sub-carrier may be used in some cases.

In some embodiments, the resource allocation message may further include an extra portion indicator to indicate whether one or more extra portions of the channel resources are allocated to the HEW stations. As an example, the extra portion indicator may include one bit to indicate possible values such as yes/no or similar, but is not limited to just a single bit. In some embodiments, a bandwidth of the extra portion of channel resources may be non-variable, such as the extra 26 tones allocation described earlier. Referring to the example HEW SIG-B signaling message 400 in FIG. 4, the extra 26 tones allocation 410 may be or may be similar to the extra portion indicator. An identifier of the HEW station 104 to which the extra 26 tones are allocated may be indicated by the "PAID/AID for extra 26 tones" indicator 415. In this example, the extra portion includes 26 tones, which may correspond to the bandwidth of 2.03125 MHz as previously described. As an example, values of 0 and 1 for the extra 26 tones allocation 410 may indicate that the extra 26 tones are not allocated or are allocated, respectively.

In some embodiments, the resource allocation message may further include one or more sub-channel allocation blocks to indicate frequency location information for one or more allocated sub-channels included in the channel. An allocation of a portion of the channel resources to a particular HEW station 104 may be indicated by an identifier of the HEW station 104 and a sequence of one or more sub-channel allocation blocks, each of which may describe a sub-channel that is allocated to the HEW station 104. As a non-limiting example, the identifier of the HEW station 104 may be immediately followed by the sequence of sub-channel allocation blocks in the resource allocation message.

Referring to the example HEW SIG-B signaling message 400 in FIG. 4, the sub-channel allocation block 425 may describe a sub-channel allocated to the HEW station 104 identified by the identifier 420 shown as PAID/AID #1. Accordingly, the block 425 immediately follows the identifier block 420 within the message 400 in this example. In addition, the sub-channel allocation blocks 435, 445 may describe two sub-channels allocated to the HEW station 104 identified by the identifier 430 shown as PAID/AID #2. As such, the blocks 435, 445 immediately follow the identifier block 430 within the message 400 in this example. It should be noted that the blocks 435, 445 may be considered a sequence of one or more sub-channel allocation blocks, as previously described. The block 425 may also be considered a sequence of a single sub-channel allocation block.

In some embodiments, the sub-channel allocation blocks may include an indicator of whether the sub-channel allocation block is a final block in the sequence. As an example, the indicator may include one bit to indicate possible values such as yes/no or similar, but is not limited to just a single bit. Referring once again to FIG. 4, the final allocation 426 is set to "YES" to indicate that the sub-channel allocation block 425 is the final block intended for the HEW station 104 identified by block 420. The final allocation 436 is set to "NO" to indicate that the sub-channel allocation block 435 is not the final block in the sequence of blocks (435 and 445) intended for the HEW station 104 identified by block 430. However, the final allocation 446 is set to "YES" to indicate that the sub-channel allocation block 445 is the final block of the sequence.

In some embodiments, the sub-channel allocation blocks may further include a channel indicator for an allocated sub-channel, which may identify which channel of the channel resources includes the allocated sub-channel. Although not limited as such, a length of the channel indicator may depend on a number of channels included in the channel resources. In addition, a length of the sub-channel allocation blocks (which include the channel indicator) may also depend at least partly on the number of channels used. Referring to the example HEW SIG-B signaling message 400 in FIG. 4, the channel index 427 may be or may be similar to the channel indicator for the sub-channel allocated by block 425.

As an example, when two channels of 20 MHz (or other bandwidth) are included, the channel indicator may include one bit, with "0" corresponding to the lower channel and "1" corresponding to the upper channel. As another example, when four channels are included, the channel indicator may include two bits, with the four channels mapped in a predetermined or known manner to the four possible (pair-wise) values of the two bits—00, 01, 10, and 11. In addition, when 8 or 16 channels are used, the technique just described may be extended with a channel indicator that includes 3 or 4 bits. It should be noted that these examples are not limiting, and any suitable number of channels may be used along with a field of bits that is large enough to cover the number of channels.

In some embodiments, the sub-channel allocation blocks may further include an indicator of a sub-channel bandwidth for sub-channels (including the allocated sub-channel) in the indicated channel. As a non-limiting example, a bandwidth for the sub-channels in the indicated channel may be selected from a group of candidate bandwidths that includes 2.03125, 4.0625, 8.125 and 16.25 MHz. In this case, the indicator of the sub-channel bandwidth may include two bits, and each of the four candidate values may be mapped in a predetermined or known manner to the four possible (pair-wise) values of the two bits—00, 01, 10, and 11. As previously described, the sub-channel bandwidths may also be specified in terms of a number of sub-carriers used. That is, with a 78.125 kHz spacing of sub-carriers included in the sub-channels, the previous group of candidate bandwidths may correspond to 26, 52, 104, and 208 sub-carriers. It should be noted that embodiments are not limited to these examples, as other values and/or a different number of candidate values may be used in some cases. Referring to the example HEW SIG-B signaling message 400 in FIG. 4, the sub-channel index 428 may be or may be similar to the indicator of the sub-channel bandwidth for the sub-channel allocated by block 425.

In some embodiments, the sub-channel allocation blocks may further include a sub-channel location indicator for a frequency location of the allocated sub-channel within the indicated channel. In some embodiments, a length of the sub-channel location indicator may depend on the indicated sub-channel bandwidth. That is, for a particular channel bandwidth, the number of sub-channels included in the channel depends on the sub-channel bandwidth. For example, a 20 MHz channel may support 8 sub-channels of 2.03125 MHz, 4 sub-channels of 4.0625 MHz, 2 sub-channels of 8.125 MHz, and one sub-channel of 16.25 MHz. Accordingly, the number of bits required for these cases may be 3, 2, 1, and 0. As an example, when 8 sub-channels are included, the values of (000, 001, . . . , 111) for the bits may correspond to the 8 sub-channels in a predetermined manner. Referring to the example HEW SIG-B signaling message 400 in FIG. 4, the sub-channel location 429 may be or may be similar to the sub-channel location indicator for the sub-channel allocated by block 425.

It should be noted that a 20 MHz channel that utilizes the 78.125 kHz spacing may include an extra portion of 26 sub-carriers along with 208 additional sub-carriers, for a total of 234 sub-carriers. The 208 sub-carriers may be divided into 8 sub-channels of 26 sub-carriers each, 4 sub-channels of 52 sub-carriers each, 2 sub-channels of 104 sub-carriers each, or one sub-channel of 208 sub-carriers. Accordingly, many different allocations of these sub-carriers are possible, some of which will be described below.

As an example, the 234 sub-carriers may be divided among two HEW stations 104 such that a first HEW station 104 is allocated 208 sub-carriers and a second HEW station is allocated the extra 26 sub-carriers. As another example, the 234 sub-carriers may be divided among three HEW stations 104 such that two of the HEW stations 104 are each allocated 104 sub-carriers and a third HEW station is allocated the extra 26 sub-carriers. As another example, the 234 sub-carriers may be divided among five HEW stations 104 such that four of the HEW stations 104 are each allocated 52 sub-carriers and the other HEW station 104 is allocated the extra 26 sub-carriers. As another example, the 234 sub-carriers may be divided among nine HEW stations 104 such that eight of the HEW stations 104 are each allocated 26 sub-carriers and the other HEW station 104 is allocated the extra 26 sub-carriers. As another example, a single HEW station 104 may be allocated all 234 sub-carriers. As another example, the channel may actually include 242 sub-carriers, which may be allocated to a single HEW station 104. These examples are not meant to be exhaustive, but may illustrate possible configurations. In other cases, multiple HEW stations 104 may be allocated different amounts of sub-carriers. For instance, two HEW stations 104 may be allocated 52 sub-carriers each, four HEW stations 104 may be allocated 26 sub-carriers each, and another HEW station 104 may be allocated the 26 extra sub-carriers.

Returning to the method 300, at operation 320, one or more uplink transmissions from the HEW stations 104 may be received at the HEW AP 102 according to the allocation of the channel resources. The uplink transmissions may include data signals, control signals, other signals, or a combination thereof. In some embodiments, the transmission of the resource allocation message and the reception of the uplink transmissions may be performed in the channel resources. In some embodiments, the HEW AP 102 may comprise one or more antennas configured to transmit the resource allocation message and to receive the uplink data transmissions. In some embodiments, the uplink data transmissions may include one or more orthogonal frequency division multiple-access (OFDMA) signals. These embodiments are not limiting, however, as other suitable formats may be used for the uplink data transmissions.

Figure 5:
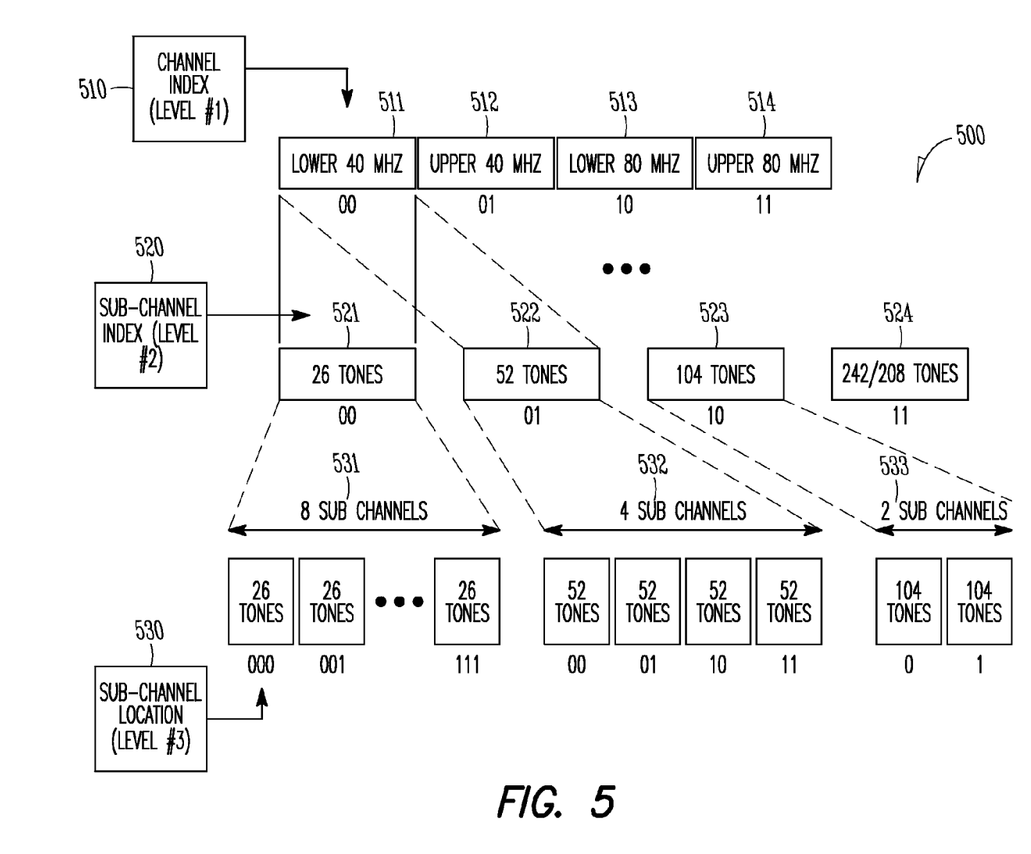
FIG. 5 illustrates an example of a hierarchical allocation of indicators for sub-channel allocation blocks in accordance with some embodiments.

FIG. 5 illustrates an example of a hierarchical allocation of indicators for sub-channel allocation blocks in accordance with some embodiments. The hierarchy 500 shown in FIG. 5 may illustrate concepts related to allocation of a sub-channel to an HEW station 104, but embodiments are not limited to what is shown in FIG. 5. In the example in FIG. 5, a 20 MHz channel is used. As a first level of the hierarchy 500, the channel index 510 may indicate which channel of the channel resources includes the allocated sub-channel. As shown, two bits are used to indicate four channels 511-514.

A second level of the hierarchy 520 includes a sub-channel index 520, which may indicate a sub-channel bandwidth. In this example, two bits indicate one of the four possible sub-channel bandwidths 521-524, which are 26, 52, 104, and 242/208 tones in this example. A third level of the hierarchy 520 includes a sub-channel location 530, which may indicate a sub-channel location within the channel. It should be noted that the number of candidate locations may depend on the sub-channel bandwidth indicated at the second level. For instance, for the case 521 of 26 tones, eight sub-channels 531 may be allocated, and three bits are used. For the case 522 of 52 tones, four sub-channels 532 may be allocated, and two bits are used. For the case 523 of 104 tones, two sub-channels 533 may be allocated, and only a single bit is used. For the case 524 of 242/208 tones, there is only a single sub-channel, and therefore the sub-channel location 530 may not be required.

The formation of the resource allocation message may employ various techniques in addition to others described, and some non-limiting examples of such will be given below. Some embodiments may include none, some, or all of the example techniques given below, and may also include other techniques described herein.

As an example, the extra portion indicator may be ignored or excluded when a distributed allocation is indicated by the resource distribution indicator. Referring back to the example HEW SIG-B signaling message 400 in FIG. 4, the extra 26 tones allocation 410 may be ignored or excluded when the allocation type 405 indicates a distributed resource allocation (e.g. when its two bits take the value of "01"). In addition, for other allocation types, the extra 26 tones allocation 410 may be included.

As another example, for the 20 MHz channel with 242 total sub-carriers available, when the HEW AP 102 allocates all 242 sub-carriers to a single HEW station 104, the extra 26 tones allocation 410 may be always set to the value of 0.

As another example, referring to the message 400 in FIG. 4, when the allocation type 405 takes the value of 01 for distributed allocation, values for the sub-channel index (such as 428, 438, 448, etc.) may indicate a spacing between sub-carriers of a sub-channel. It should be recalled that the channel may include sub-carriers spaced apart by a sub-carrier spacing, which will be denoted as F_sc., and each sub-channel may include a subset of those sub-carriers. Values of 00, 01, 10, and 11 for the sub-channel index may indicate that the sub-carriers of a sub-channel are spaced apart by 9*F_sc, 5*F_sc, 2*F_sc, and F_sc, respectively. This mapping is a non-limiting example, and other spacings may be mapped to the sub-channel index values.

As another example, referring to the message 400 in FIG. 4, the sub-channel location (such as 429, 439, 449, etc.) may indicate a location of a sub-channel within the channel bandwidth when the allocation type 405 is set to 01 or 10. When the allocation type 405 is set to 00 or 11 and the sub-channel index 428, 438, 448 takes values of 00, 01, or 10, the value of sub-channel location 429, 439, 449 may include the final sub-carrier allocated to the HEW station 104.

Figure 6:
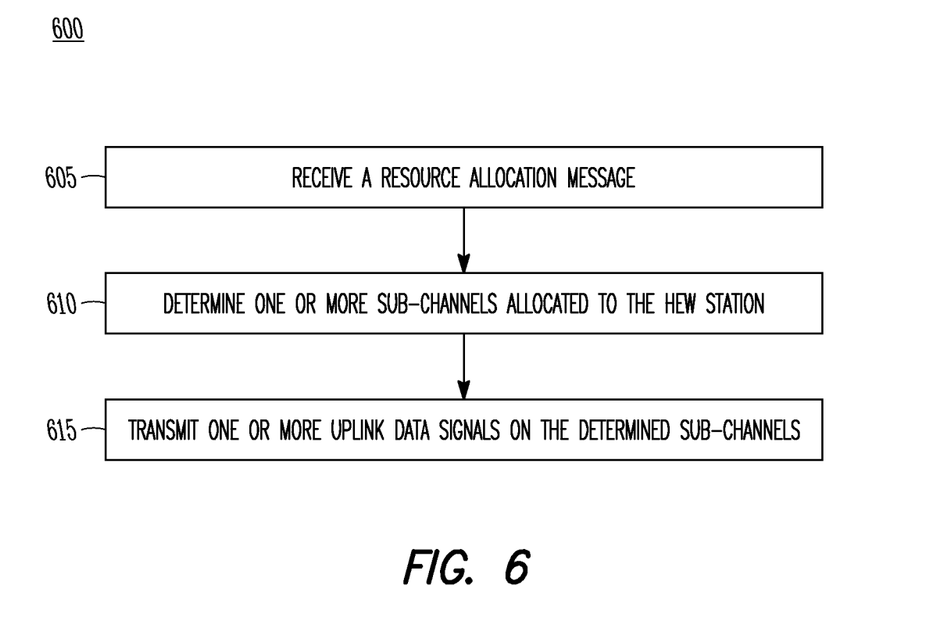
FIG. 6 illustrates the operation of another method of channel resource allocation signaling in accordance with some embodiments.

FIG. 6 illustrates the operation of another method of channel resource allocation signaling in accordance with some embodiments. As mentioned previously regarding the method 300, embodiments of the method 600 may include additional or even fewer operations or processes in comparison to what is illustrated in FIG. 6 and embodiments of the method 600 are not necessarily limited to the chronological order that is shown in FIG. 6. In describing the method 600, reference may be made to FIGS. 1-5, although it is understood that the method 600 may be practiced with any other suitable systems, interfaces and components. In addition, embodiments of the method 600 may refer to eNBs 104, UEs 102, APs, STAs or other wireless or mobile devices.

It should be noted that the method 600 may be practiced at an HEW station 104, and may include exchanging of signals or messages with an HEW AP 102. Similarly, the method 300 may be practiced at the HEW AP 102, and may include exchanging of signals or messages with the HEW station 104. In some cases, operations and techniques described as part of the method 300 may be relevant to the method 600. For instance, an operation of the method 300 may include transmission of a block by the AP 102 while an operation of the method 600 may include reception of the same block or similar block by the HEW station 104.

In addition, previous discussion of various techniques and concepts may be applicable to the method 600 in some cases, including the format and contents of the resource allocation message as previously described. Other concepts previously described, such as the channel resources, sub-channels, extra portions, sub-carriers, uplink data transmissions and signals, and uplink bandwidth request messages, may also be applicable to the method 600. In addition, the example message format shown in FIG. 4 may also be used, in some cases.

At operation 605, the HEW station 104 may receive a resource allocation message from an HEW AP 102 to indicate an allocation of channel resources for uplink data transmission to the HEW AP 102. The HEW station 104 may determine one or more sub-channels allocated to the HEW station 104 at operation 610. The determination may be based on knowledge of the format used by the HEW AP 102 for assembling the resource allocation message. At operation 615, the HEW station 104 may transmit one or more uplink signals on the determined sub-channels. The uplink signals may be transmitted for reception at the HEW AP 102, in some cases. In some embodiments, the uplink signals may include or may be part of one or more OFDMA signals, though not limited as such.

An example of a high-efficiency Wi-Fi (HEW) access point (AP) is disclosed herein. The HEW AP may comprise hardware processing circuitry configured to transmit a resource allocation message to indicate an allocation of channel resources for uplink transmissions by one or more HEW stations. The hardware processing circuitry may be further configured to receive one or more uplink transmissions from the HEW stations according to the allocation. The resource allocation message may include a resource distribution indicator to indicate whether the HEW stations are allocated contiguous portions of the channel resources. The channel resources may include one or more sub-channels and an extra portion of channel resources. The resource allocation message may further include an extra portion indicator to indicate whether the extra portion of channel resources is allocated to one of the HEW stations.

In some examples, the sub-channels may comprise a predetermined bandwidth and further comprise multiple sub-carriers. In some examples, the resource allocation message may further include one or more sub-channel allocation blocks to indicate frequency location information for one or more allocated sub-channels included in the channel resources. In some examples, an allocation of at least a portion of the channel resources to one of the HEW stations may be indicated by an identifier of the HEW station and a sequence of one or more sub-channel allocation blocks. Each sub-channel allocation block in the sequence may include an indicator of whether the sub-channel allocation block is a final block in the sequence.

In some examples, the channel resources may include one or more channels that include multiple sub-channels. The sub-channel allocation blocks may include a channel indicator for an allocated sub-channel and an indicator of a sub-channel bandwidth for sub-channels in the indicated channel. The sub-channel allocation blocks may further include a sub-channel location indicator for a frequency location of the allocated sub-channel within the indicated channel. A length of the sub-channel location indicator may depend on the indicated sub-channel bandwidth. In some examples, a length of the channel indicator may depend on a number of channels included in the channel resources.

In some examples, the number of channels may be selected from one, two, four or eight, and each channel comprises a bandwidth of 20 MHz. In some examples, at least one of the HEW stations may be allocated a first sub-channel in a first channel and a second sub-channel in a second channel. In some examples, the transmission of the resource allocation message and the reception of the uplink transmissions may be performed in the channel resources.

In some examples, when the resource distribution indicator indicates that the HEW stations are allocated non-contiguous portions of the channel resources, at least one of the HEW stations may be allocated a first sub-channel and a second sub-channel and may not be allocated a third sub-channel that is located in frequency between the first and second sub-channels. In some examples, when the resource distribution indicator indicates that the HEW stations are allocated distributed portions of the channel resources, the sub-channels may include multiple sub-carriers interleaved in frequency.

In some examples, a bandwidth for the sub-channels may be selected from a group of candidate bandwidths that includes 2.03125, 4.0625, 8.125 and 16.25 MHz and a bandwidth of the extra portion of channel resources may be non-variable. In some examples, the uplink data transmissions may include one or more orthogonal frequency division multiple-access (OFDMA) signals. In some examples, the resource allocation message may be included in an HEW SIG-B signaling message. In some examples, the HEW AP may further comprise one or more antennas configured to transmit the resource allocation message and to receive the uplink data transmissions.

A method for communication performed by a high-efficiency Wi-Fi (HEW) access point (AP) is also disclosed herein. The method may comprise allocating at least a portion of channel resources to one or more HEW stations for use in uplink transmissions. The channel resources may include one or more channels that include one or more sub-channels. The method may further comprise transmitting a resource allocation message that includes sub-channel allocation blocks for a group of two or more sub-channels allocated to a first HEW station. The group of sub-channels allocated to the first HEW station may include a first sub-channel included in a first channel and excludes sub-channels adjacent to the first sub-channel. A length of the sub-channel allocation blocks may depend at least partly on a number of channels used.

In some examples, the group of sub-channels allocated to the first HEW station further may include a second sub-channel included in a second channel. In some examples, the resource allocation message may further include one or more sub-channel allocation blocks for allocation of one or more sub-channels to a second HEW station. In some examples, at least one of the channels may include an integer number of sub-channels and may further include an extra portion of channel resources. The resource allocation message may further include an extra portion indicator to indicate whether the extra portion is allocated to one of the HEW stations.

In some examples, the resource allocation message may further include a resource distribution indicator to indicate contiguous or non-contiguous allocation of the sub-channels. In some examples, the sub-channel allocation blocks may be included as part of a sequence in the resource allocation message. Each sub-channel allocation block may include an indicator of whether the sub-channel allocation block is the final block in the sequence. In some examples, the method may further comprise receiving, from the first HEW station, an uplink data transmission that includes one or more orthogonal frequency division multiple-access (OFDMA) signals. In some examples, the resource allocation message may be included in an HEW SIG-B signaling message. The number of channels may be selected from one, two, four or eight, and each channel comprises a bandwidth of 20 MHz.

A non-transitory computer-readable storage medium that stores instructions for execution by one or more processors of a high-efficiency Wi-Fi (HEW) access point (AP) to perform operations for communication is also disclosed herein. The operations may configure the one or more processors to transmit a resource allocation message to indicate an allocation of channel resources for uplink transmissions by one or more HEW stations. The operations may further configure the one or more processors to receive one or more uplink transmissions from the HEW stations according to the allocation. The resource allocation message may include a resource distribution indicator to indicate whether the HEW stations are allocated contiguous portions of the channel resources. The channel resources may include one or more sub-channels and an extra portion of frequency resources. The resource allocation message may further include an extra portion indicator to indicate whether the extra portion of frequency resources is allocated to one of the HEW stations.

In some examples, the resource allocation message may further include one or more sub-channel allocation blocks to indicate frequency location information for one or more allocated sub-channels included in the channel resources. The channel resources may include one or more channels that include multiple sub-channels. The sub-channel allocation blocks may include a channel indicator for an allocated sub-channel and an indicator of a frequency span for sub-channels in the indicated channel. The sub-channel allocation blocks may further include a sub-channel location indicator for a frequency location of the allocated sub-channel within the indicated channel. A length of the sub-channel location indicator may depend on the frequency span.

An example of a high-efficiency Wi-Fi (HEW) station is also disclosed herein. The HEW station may comprise hardware processing circuitry configured to receive, from an HEW access point (AP), a resource allocation message to indicate an allocation of channel resources for transmission of uplink signals by the HEW station and one or more other HEW stations. The hardware processing circuitry may be further configured to transmit one or more uplink signals according to the allocation. The resource allocation message may include a resource distribution indicator to indicate a contiguous allocation of the channel resources. The channel resources may include one or more sub-channels and an extra portion of channel resources. The sub-channels may comprise a predetermined bandwidth and further comprise multiple sub-carriers. The resource allocation message may further include an extra portion indicator to indicate whether the extra portion of channel resources is allocated.

In some examples, the HEW station may be allocated a group of sub-channels included in the channel resources. The resource allocation message may include an identifier of the HEW station and a sequence of one or more sub-channel allocation blocks. Each sub-channel allocation block may indicate frequency location information for one of the sub-channels allocated to the HEW station. Each sub-channel allocation block in the sequence may include an indicator of whether the sub-channel allocation block is a final block in the sequence.

In some examples, the channel resources may include one or more channels that include multiple sub-channels. The sub-channel allocation blocks may include a channel indicator for an allocated sub-channel and an indicator of a sub-channel bandwidth for sub-channels in the indicated channel. The sub-channel allocation blocks may further include a sub-channel location indicator for a frequency location of the allocated sub-channel within the indicated channel. A length of the sub-channel location indicator may depend on the indicated sub-channel bandwidth.

In some examples, a bandwidth for the sub-channels may be selected from a group of candidate bandwidths that includes 2.03125, 4.0625, 8.125 and 16.25 MHz and a bandwidth of the extra portion of channel resources may be non-variable. In some examples, the HEW station may further comprise one or more antennas configured to receive the resource allocation message and to transmit the uplink signals.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) access point (AP) comprising: memory; and, hardware processing circuitry coupled to the memory, the hardware processing circuitry configured to:
configure the HE AP to transmit a resource allocation message to indicate an allocation of channel resources for uplink transmissions by one or more HE stations; and
decode one or more uplink transmissions from the HE stations according to the allocation, wherein the resource allocation message includes a resource distribution indicator to indicate whether the HE stations are allocated contiguous portions of the channel resources;
wherein the channel resources include one or more sub-channels and an extra portion of channel resources; and
the resource allocation message further includes a sub-field for an extra portion indicator to indicate whether the extra portion of channel resources is allocated to one of the HE stations, wherein the extra portion is in a center of the channel resources straddling a direct current (DC).

2. The apparatus of the HE AP according to claim 1, wherein the sub-channels comprise a predetermined bandwidth and further comprise multiple sub-carriers.

3. The apparatus of the HE AP according to claim 1, wherein the resource allocation message further includes one or more sub-channel allocation blocks to indicate frequency location information for one or more allocated sub-channels included in the channel resources.

4. The apparatus of the HE AP according to claim 3, wherein:
an allocation of at least a portion of the channel resources to one of the HE stations is indicated by an identifier of the HE station and a sequence of one or more sub-channel allocation blocks; and
each sub-channel allocation block in the sequence includes an indicator of whether the sub-channel allocation block is a final block in the sequence.

5. The apparatus of the HE AP according to claim 3, wherein:
the channel resources include one or more channels that include multiple sub-channels, and the sub-channel allocation blocks include:
a channel indicator for an allocated sub-channel, an indicator of a sub-channel bandwidth for sub-channels in the indicated channel, and a sub-channel location indicator for a frequency location of the allocated sub-channel within the indicated channel, wherein a length of the sub-channel location indicator depends on the indicated sub-channel bandwidth.

6. The apparatus of the HE AP according to claim 5, wherein a length of the channel indicator depends on a number of channels included in the channel resources.

7. The apparatus of the HE AP according to claim 6, wherein the number of channels is selected from one, two, four or eight, and each channel comprises a bandwidth of 20 MHz.

8. The apparatus of the HE AP according to claim 5, wherein at least one of the HE stations is allocated a first sub-channel in a first channel and a second sub-channel in a second channel.

9. The apparatus of the HE AP according to claim 1, wherein the transmission of the resource allocation message and the reception of the uplink transmissions are performed in the channel resources.

10. The apparatus of the HE AP according to claim 1, wherein when the resource distribution indicator indicates that the HE stations are allocated non-contiguous portions of the channel resources, at least one of the HE stations is allocated a first sub-channel and a second sub-channel and is not allocated a third sub-channel that is located in frequency between the first and second sub-channels.

11. The apparatus of the HE AP according to claim 2, wherein when the resource distribution indicator indicates that the HE stations are allocated distributed portions of the channel resources, the sub-channels include multiple sub-carriers interleaved in frequency.

12. The apparatus of the HE AP according to claim 1, wherein:
a bandwidth for the sub-channels is selected from a group of candidate bandwidths that includes 2.03125, 4.0625, 8.125 and 16.25 MHz; and
a bandwidth of the extra portion of channel resources is non-variable.

13. The apparatus of the HE AP according to claim 1, wherein the uplink data transmissions include one or more orthogonal frequency division multiple-access (OFDMA) signals.

14. The apparatus of the HE AP according to claim 1, wherein the resource allocation message is included in an HEW SIG-B signaling message.

15. The apparatus of the HE AP according to claim 1, wherein the HE AP further comprises one or more antennas configured to transmit the resource allocation message and to receive the uplink data transmissions.

16. A method for communication performed by an apparatus of a high-efficiency (HE) access point (AP), the method comprising:
allocating at least a portion of channel resources to one or more HE stations for use in uplink transmissions, the channel resources including one or more channels that include one or more sub-channels; and
configuring the HE AP to transmit a resource allocation message that includes sub-channel allocation blocks for a group of two or more sub-channels allocated to a first HE station, wherein the group of sub-channels allocated to the first HE station includes a first sub-channel included in a first channel and excludes sub-channels adjacent to the first sub-channel, and wherein a length of the sub-channel allocation blocks depends at least partly on a number of channels used, wherein the resource allocation message further comprises a sub-field for an extra portion indicator to indicate whether the extra portion of channel resources is allocated to one of the HE stations, and wherein the extra portion is in a center of the channel resources straddling a direct current (DC).

17. The method according to claim 16, wherein the group of sub-channels allocated to the first HE station further includes a second sub-channel included in a second channel.

18. The method according to claim 16, wherein the resource allocation message further includes one or more sub-channel allocation blocks for allocation of one or more sub-channels to a second HE station.

19. The method according to claim 16, wherein:
at least one of the channels includes an integer number of sub-channels and further includes an extra portion of channel resources, and the resource allocation message further includes an extra portion indicator to indicate whether the extra portion is allocated to one of the HE stations.

20. The method according to claim 16, wherein the resource allocation message further includes a resource distribution indicator to indicate contiguous or non-contiguous allocation of the sub-channels.

21. The method according to claim 16, wherein the sub-channel allocation blocks are included as part of a sequence in the resource allocation message, each sub-channel allocation block including an indicator of whether the sub-channel allocation block is the final block in the sequence.

22. The method according to claim 16, the method further comprising receiving, from the first HE station, an uplink data transmission that includes one or more orthogonal frequency division multiple-access (OFDMA) signals.

23. The method according to claim 16, wherein:
the resource allocation message is included in an HE SIG-B signaling message, and the number of channels is selected from one, two, four or eight, and each channel comprises a bandwidth of 20 MHz.

24. A non-transitory computer-readable storage medium that stores instructions for execution by one or more processors of an apparatus of a high-efficiency HE) access point (AP) to perform operations for communication, the operations to configure the one or more processors to:
configure the HE AP to transmit a resource allocation message to indicate an allocation of channel resources for uplink transmissions by one or more HE stations; and
configure the HE AP to receive one or more uplink transmissions from the HE stations according to the allocation, wherein the resource allocation message includes a resource distribution indicator to indicate whether the HE stations are allocated contiguous portions of the channel resources;
wherein the channel resources include one or more sub-channels and an extra portion of frequency resources; and
the resource allocation message further includes a sub-field for an extra portion indicator to indicate whether the extra portion of frequency resources is allocated to one of the HE stations, wherein the extra portion is in a center of the channel resources straddling a direct current (DC).

25. The non-transitory computer-readable storage medium according to claim 24, wherein:
the resource allocation message further includes one or more sub-channel allocation blocks to indicate frequency location information for one or more allocated sub-channels included in the channel resources, the channel resources include one or more channels that include multiple sub-channels, and the sub-channel allocation blocks include:
a channel indicator for an allocated sub-channel, an indicator of a frequency span for sub-channels in the indicated channel, and a sub-channel location indicator for a frequency location of the allocated subchannel within the indicated channel, wherein a length of the sub-channel location indicator depends on the frequency span.

26. An apparatus of a high-efficiency (HE) station comprising: memory; and, hardware processing circuitry coupled to the memory, the hardware processing circuitry configured to:
configure the HE station to receive, from an HE access point (AP), a resource allocation message to indicate an allocation of channel resources for transmission of uplink signals by the HEW station and one or more other HEW stations; and
configure the HE station to transmit one or more uplink signals according to the allocation, wherein the resource allocation message includes a resource distribution indicator to indicate a contiguous allocation of the channel resources;
wherein the channel resources include one or more sub-channels and an extra portion of channel resources;
the sub-channels comprise a predetermined bandwidth and further comprise multiple sub-carriers; and
the resource allocation message further includes a subfield for an extra portion indicator to indicate whether the extra portion of channel resources is allocated, wherein the extra portion is in a center of the channel resources straddling a direct current (DC).

27. The apparatus of the HE station according to claim 26, wherein:
the HE station is allocated a group of sub-channels included in the channel resources, the resource allocation message includes an identifier of the HE station and a sequence of one or more sub-channel allocation blocks, each sub-channel allocation block indicating frequency location information for one of the sub-channels allocated to the HE station, and each sub-channel allocation block in the sequence includes an indicator of whether the sub-channel allocation block is a final block in the sequence.

28. The apparatus of the HE station according to claim 27, wherein:
the channel resources include one or more channels that include multiple sub-channels, and the sub-channel allocation blocks include:
a channel indicator for an allocated sub-channel, an indicator of a sub-channel bandwidth for sub-channels in the indicated channel, and a sub-channel location indicator for a frequency location of the allocated sub-channel within the indicated channel, wherein a length of the sub-channel location indicator depends on the indicated sub-channel bandwidth.

29. The apparatus of the HE station according to claim 26, wherein:
a bandwidth for the sub-channels is selected from a group of candidate bandwidths that includes 2.03125, 4.0625, 8.125 and 16.25 MHz; and
a bandwidth of the extra portion of channel resources is non-variable.

30. The apparatus of the HE station according to claim 26, wherein the HE station further comprises one or more antennas configured to receive the resource allocation message and to transmit the uplink signals.

* * * * *